United States Patent
Zamponi et al.

(10) Patent No.: US 12,442,446 B2
(45) Date of Patent: Oct. 14, 2025

(54) LUBRICATION SYSTEM WITH A RESERVE TANK

(71) Applicant: AIRBUS HELICOPTERS, Marignane (FR)

(72) Inventors: Laurent Zamponi, Vitrolles (FR); Jerome Belmonte, Aix en Provence (FR); Eric Fabrigat, Velaux (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/476,730

(22) Filed: Sep. 16, 2021

(65) Prior Publication Data
US 2022/0107018 A1  Apr. 7, 2022

(30) Foreign Application Priority Data
Oct. 1, 2020 (FR) .................................... 2010022

(51) Int. Cl.
*F16H 57/04* (2010.01)
*F01M 11/00* (2006.01)
*B64C 27/12* (2006.01)

(52) U.S. Cl.
CPC ..... *F16H 57/0442* (2013.01); *F16H 57/0404* (2013.01); *F16H 57/0435* (2013.01);
(Continued)

(58) Field of Classification Search
CPC ............. F16H 57/0435; F16H 57/0443; F16H 57/0442; F16H 57/0449; F16H 57/045; F16H 57/046; F01M 2011/0095
See application file for complete search history.

(56) References Cited

U.S. PATENT DOCUMENTS

| | | | |
|---|---|---|---|
| 1,220,810 A * | 3/1917 | Alquist | F16H 57/0447 184/6.12 |
| 4,572,120 A * | 2/1986 | Matsumoto | F01M 11/065 123/73 AD |

(Continued)

FOREIGN PATENT DOCUMENTS

| | | |
|---|---|---|
| EP | 0443901 A1 | 8/1991 |
| EP | 1342644 A1 | 9/2003 |

(Continued)

OTHER PUBLICATIONS

EP3315737 English Translation (Year: 2018).*

(Continued)

*Primary Examiner* — Minh Truong
(74) *Attorney, Agent, or Firm* — Brooks Kushman P.C.

(57) ABSTRACT

A lubrication system for a mechanical system, the lubrication system comprising a main tank, a reserve tank and a main lubrication circuit. The main lubrication circuit comprises, in particular, a pump drawing in the lubricating liquid from the main tank via a main suction point and a main suction pipe connecting the main suction point to the pump. The reserve tank is supplied with lubricating liquid either directly from the main tank or via the main lubrication circuit. The reserve tank is connected to the main suction pipe via an outlet pipe and the reserve tank is located above the main suction point so that the lubricating liquid flows through the outlet pipe to the main suction pipe by gravity.

20 Claims, 2 Drawing Sheets

(52) U.S. Cl.
CPC ..... *F16H 57/0443* (2013.01); *F16H 57/0449* (2013.01); *F16H 57/045* (2013.01); *F16H 57/046* (2013.01); *B64C 27/12* (2013.01); *F01M 2011/0095* (2013.01)

(56) References Cited

U.S. PATENT DOCUMENTS

| | | | | |
|---|---|---|---|---|
| 4,721,185 | A * | 1/1988 | Weigle | B60R 16/08 |
| | | | | 184/6.12 |
| 5,121,815 | A | 6/1992 | Francois et al. | |
| 5,662,188 | A | 9/1997 | Ito et al. | |
| 6,394,123 | B2 * | 5/2002 | Menu | B64D 37/22 |
| | | | | 137/171 |
| 8,181,746 | B2 * | 5/2012 | Szolomayer | F01M 11/067 |
| | | | | 137/574 |
| 8,602,166 | B2 | 12/2013 | Mullen et al. | |
| 9,624,798 | B2 | 4/2017 | Mullen et al. | |
| 11,352,905 | B2 * | 6/2022 | Bellis | F16H 57/0443 |
| 11,391,363 | B2 * | 7/2022 | Sbabo | F16H 57/0445 |
| 2003/0188529 | A1 | 10/2003 | Collet et al. | |
| 2011/0150655 | A1 * | 6/2011 | Tietze | F16H 57/0447 |
| | | | | 74/467 |
| 2016/0363208 | A1 | 12/2016 | Louis | |
| 2017/0175875 | A1 | 6/2017 | Lapeyre et al. | |
| 2018/0087420 | A1 * | 3/2018 | Poster | F16H 57/0449 |
| 2018/0106360 | A1 * | 4/2018 | Gmirya | F16H 57/0456 |
| 2018/0347687 | A1 | 12/2018 | Waser | |
| 2020/0116048 | A1 * | 4/2020 | Bellis | F01D 25/16 |
| 2022/0034396 | A1 * | 2/2022 | Ogasawara | F16N 7/38 |

FOREIGN PATENT DOCUMENTS

| | | | | |
|---|---|---|---|---|
| EP | 3104044 | A1 | 12/2016 | |
| EP | 3315737 | A1 * | 5/2018 | ............... F01M 1/16 |
| EP | 4187128 | A1 * | 5/2023 | ............. B64C 27/12 |
| FR | 2581700 | A1 * | 11/1986 | ........... F01M 11/061 |
| FR | 2658577 | A1 | 8/1991 | |
| FR | 2685758 | A1 | 7/1993 | |
| FR | 3045764 | A1 | 6/2017 | |
| JP | H08105520 | A | 4/1996 | |
| KR | 20190026353 | A * | 3/2019 | ......... F16H 57/0449 |

OTHER PUBLICATIONS

French Search Report for French Application No. FR2010022, Completed by the French Patent Office, Dated May 11, 2021, 9 pages.
Office Action for Korean Application No. KR1020210118325, dated Sep. 15, 2023, 15 Pages.
2nd Office Action for Korean Application No. KR1020210118325, dated May 27, 2024, 10 Pages.

* cited by examiner

LUBRICATION SYSTEM WITH A RESERVE TANK

CROSS-REFERENCE TO RELATED APPLICATIONS

This application claims priority to French patent application No. FR 20 10022 filed on Oct. 1, 2020, the disclosure of which is incorporated in its entirety by reference herein.

TECHNICAL FIELD

The present disclosure relates to the field of lubrication, for example of gearboxes, in particular gearboxes intended for a rotary-wing aircraft.

The present disclosure relates to a lubrication system provided with a reserve tank intended for lubricating a mechanical system. This lubrication system is particularly suitable for lubricating a main gearbox of a rotary-wing aircraft.

BACKGROUND

A mechanical system generally includes rotating elements, such as shafts and bearings, and power transmission and speed reducing or increasing elements, such as pinions and/or gears. It is essential, for the correct operation of the mechanical system, to lubricate and cool these elements with a suitable lubricating liquid, e.g., oil. This lubrication is generally provided by a lubrication system and has the main functions of limiting the wear and the heating of these elements of the mechanical system and, as a result, of extending the service life of the mechanical system. Without such lubrication, the operation of the mechanical system can be rapidly degraded or even become impossible.

A lubrication system may include one or more lubrication circuits conveying the lubricating liquid from a tank to the elements to be lubricated. A lubrication circuit comprises, in particular, a flow generator such as a pump in order to supply the lubrication circuit with lubricating liquid and thus allow it to circulate in the lubrication circuit, as well as devices for spraying the lubricating liquid, such as a port, a sprinkler, a nozzle or any equivalent means, intended to spray the lubricating liquid towards the elements to be lubricated.

A lubrication circuit also comprises at least one tank containing the lubricating liquid. A tank may be formed, in particular, by a casing of the mechanical system to be lubricated, for example a casing of the main gearbox of a rotary-wing aircraft. A lubrication circuit also comprises pipes arranged, in particular, between the pump and the spraying devices.

In addition, a lubrication circuit may include filtration devices for capturing foreign bodies that may be present in the lubricating liquid. A filtration device may include different types of filters. For example, a filter commonly referred to as a "strainer" may be arranged upstream of the pump, in a tank. Other filters may also be arranged at various locations in the lubrication circuit.

A lubrication circuit may also include a heat exchanger for cooling the lubricating liquid heated by contact with the elements to be lubricated.

However, leaks may appear in particular in these pipes or indeed at connections between a pipe and a component of the lubrication circuit, these leaks being caused, for example, by vibrational and thermal stresses resulting from the operation of the mechanical system. As a result of such leaks, all or some of the lubricating liquid circulating in the lubrication circuit and stored in a tank may drain out of the lubrication circuit.

A leak may also appear in the main tank, causing all or some of the lubricating liquid contained therein to drain out, depending on the position of said leaks.

As a result of such leaks and in the event that lubrication stops taking place, the mechanical system may over time sustain damage to a greater or lesser extent. The consequence of this damage may be degraded operation of the mechanical system, or even the stoppage of the mechanical system.

In order to mitigate these consequences, a lubrication system may include several lubrication circuits. For example, a lubrication system may comprise two lubrication circuits in parallel, a first lubrication circuit possibly being able to compensate for a leak in a pipe of a second lubrication circuit.

According to another example, a lubrication system may comprise at least one main lubrication circuit and one back-up lubrication circuit. The purpose of the back-up lubrication circuit is to ensure, when the main lubrication circuit is out of service, lubrication of at least some of the elements of the mechanical system, namely components considered essential to this mechanical system, for a limited period of time in order to ensure the operation of this mechanical system.

A back-up lubrication circuit may use the lubricating liquid located in the tank also used by a main lubrication circuit.

A back-up lubrication circuit may alternatively comprise a dedicated reserve tank and use the lubricating liquid located in this reserve tank. A reserve tank may be arranged outside the mechanical system to be lubricated or directly inside this mechanical system.

A reserve tank may be positioned such that the lubricating liquid flows by gravity from this reserve tank, for example via a pipe, only to the essential components to be lubricated.

For example, according to the various examples described in documents FR 2 658 577, U.S. Pat. Nos. 8,602,166 and 9,624,798, the lubricating liquid can flow continuously by gravity from such a reserve tank directly onto the essential components to be lubricated. The reserve tank can be permanently supplied by a main lubrication circuit and is positioned above the essential components to be lubricated, inside the mechanical system. Thus, in the event of leakage or failure of the main lubrication circuit, the reserve tank is no longer supplied with lubricating liquid, but helps ensure lubrication of only the essential components for a limited period of time until the lubricating liquid contained in this reserve tank has all been used up.

The terms "under", "below" and "above" should be understood substantially in relation to the direction of the Earth's gravity oriented vertically downwards. Similarly, the term "vertical" should be understood to mean in this direction of the Earth's gravity, i.e., parallel to this direction of the Earth's gravity. In addition, the terms "upper" and "lower" should also be understood in relation to the direction of the Earth's gravity. In the environment of an aircraft, the direction of the Earth's gravity is to be considered when this aircraft is landed normally on horizontal ground on its landing gear.

A reserve tank may also be provided with valves intended to release the lubricating liquid to the elements to be lubricated on command, as described in document FR 3 045 764. The valves are, for example, operated pyrotechnically, and after they have been opened, the lubricating liquid flows by gravity to the elements to be lubricated.

Finally, document FR 2 685 758 describes a back-up lubrication circuit comprising a dedicated reserve tank and a channel conveying the lubricating liquid contained in this reserve tank only to the essential components to be lubricated. The reserve tank may be pressurized, and the opening of a valve allows the lubricating liquid to circulate in the channel. This reserve tank may also be non-pressurized, in which case a pump supplies the channel. This reserve tank can thus be positioned without any particular constraint with respect to the essential components to be lubricated. The back-up circuit operates for a limited time until the lubricating liquid contained in the reserve tank has all been used up.

The technological background of the disclosure includes, in particular, documents EP 3 104 044, EP 1 342 644 and US 2018/0347687.

Irrespective of the solution chosen, these examples from the prior art propose, following a failure or a leak, lubrication that is limited in time, but also limited only to some of the elements of the mechanical system, namely the components of this mechanical system that are considered essential.

The aim of the present disclosure is therefore to propose an alternative solution for the emergency lubrication of a mechanical system that makes it possible to overcome the above-mentioned limitations, and that makes it possible to provide simple and reliable residual lubrication of all the elements of the mechanical system that require such lubrication for a limited and defined period of time following the presence of a total leak or a failure in the lubrication system.

SUMMARY

An object of the present disclosure relates, for example, to a lubrication system for a mechanical system, the lubrication system comprising a main tank and a reserve tank, a main lubrication circuit, the main tank containing a lubricating liquid, the main lubrication circuit comprising a main flow generator such as a pump, as well as devices for spraying the lubricating liquid, the main lubrication circuit comprising a main suction point for drawing in the lubricating liquid located in the main tank and a main suction pipe connecting the main suction point to the main flow generator, the reserve tank comprising an inlet for receiving lubricating liquid.

The main lubrication circuit may also comprise, in the usual manner e.g., pipes or hoses connecting the various components of the main lubrication circuit. The main suction point is constituted, for example, by the end of the main suction pipe situated in the main tank.

During operation of the main lubrication circuit, the main flow generator draws in the lubricating liquid from the main tank via the main suction point and distributes it into the pipes, and then into the spraying devices, in order to lubricate the mechanical system. The inlet of the reserve tank is then supplied with lubricating liquid from the main tank.

For example, the mechanical system is a main gearbox of a rotary-wing aircraft.

The lubrication system according to the disclosure is remarkable in that it comprises an outlet pipe in fluid communication with the reserve tank, the outlet pipe connecting the reserve tank to the main suction pipe of the main lubrication circuit so that the lubricating liquid flows through the outlet pipe by gravity, from the reserve tank to the main suction pipe.

Indeed, the reserve tank is situated at least partially at a plane higher than a plane at which the main suction point is situated, in the direction of the Earth's gravity, these planes being perpendicular to this direction of the Earth's gravity, such that the lubricating liquid flows by gravity into the outlet pipe, from the reserve tank to the main suction pipe. When the mechanical system equips an aircraft, the direction of the Earth's gravity is to be considered when this aircraft is landed normally on horizontal ground on its landing gear. Consequently, since the reserve tank is located above the main suction point in the direction of the Earth's gravity, the lubricating liquid in the reserve tank can flow continuously through the outlet pipe, by gravity, from the reserve tank to the main suction pipe.

The main suction pipe should be considered to be a fluid communication line located between the main suction point and the main flow generator, this fluid communication line being intended to contain and/or guide the lubricating liquid between the main suction point and the main flow generator. For example, the main suction pipe may comprise one or more hoses, a space situated between the main suction point and the main flow generator, etc.

The main suction point may be at a distance from the main flow generator. In such a scenario, the outlet pipe may be connected to any point of the main suction pipe, as long as this point is located below the reserve tank in the direction of the Earth's gravity.

The main suction point may be coupled to the main flow generator, in which case the main suction pipe may be combined with an inlet port of the main flow generator. In such a scenario, the outlet pipe opens at this inlet port of the main flow generator. The outlet pipe in communication with the reserve tank can thus be connected to this inlet port of the main flow generator at one of its ends.

Moreover, the reserve tank is supplied with the lubricating liquid from the main tank, either directly with the lubricating liquid located in the main tank, for example, or with the lubricating liquid drawn in from the main tank and circulating in the main lubrication circuit. In the absence of a failure of the lubrication system that will drain the main tank of the lubricating liquid contained therein, the reserve tank is continuously supplied with lubricating liquid, and the lubricating liquid contained in this reserve tank is simultaneously discharged through the outlet pipe connected to this reserve tank to the main supply pipe. This lubricating liquid discharged from the reserve tank is thus reinjected into the main lubrication circuit via the main supply pipe.

Following a failure of the lubrication system, the level of lubricating liquid in the main tank may drop below the main suction point. The reserve tank is also no longer supplied with lubricating liquid. Such a failure may, for example, be in the form of a leak in the main tank, or indeed a leak in a pipe of a lubrication circuit other than the main lubrication circuit, or even a leak in the main lubrication circuit.

However, the lubricating liquid present in the reserve tank flows by gravity through the outlet pipe towards the main suction pipe and can then advantageously be drawn in by the main flow generator in order to supply the main lubrication circuit and the spraying devices of the main lubrication circuit, thus advantageously lubricating the mechanical system.

As a result, the mechanical system can be lubricated by means of the spraying devices of the main lubrication circuit, despite a failure of the main tank that drains the main tank, for example, for a limited period of time corresponding to the time taken for the reserve tank to be drained. Advantageously, all the elements of the mechanical system requiring lubrication are lubricated, unlike with the solutions of the prior art, which are limited to lubricating elements that are considered essential.

It should therefore be understood that the lubrication system according to the disclosure can allow effective residual lubrication following a drop in the level of the lubricating liquid in the main tank below the main suction point, this residual lubrication advantageously using the existing main lubrication circuit and, in particular, its spraying devices, in order to lubricate the mechanical system.

Indeed, the lubrication system of the disclosure does not require any specific spraying devices, or numerous pipes dedicated to emergency lubrication. Only the installation of the reserve tank, the supplying of same and the presence of the outlet pipe are necessary. Therefore, it is possible for a reserve tank as described to be installed on a mechanical system and connected to an existing lubrication circuit.

According to a first embodiment of the disclosure, the reserve tank may be located in the main tank. The inlet of the reserve tank is then arranged at least partially below a nominal level of the lubricating liquid in the main tank, in the direction of the Earth's gravity, when the main tank is substantially horizontal. The nominal level of the lubricating liquid in the main tank is to be considered when the main tank contains a quantity of lubricating liquid equal to the nominal quantity that it must contain and when the main tank is horizontal. The nominal level of the lubricating liquid in the main tank is also to be considered when the mechanical system is stationary, this nominal level also being a static level. Under such conditions, the reserve tank is continuously filled with the lubricating liquid present in the main tank.

The reserve tank thus advantageously does not create a dead volume, i.e., a mass of lubricating liquid that is not used directly for lubricating the mechanical system, this reserve tank permanently supplying the main lubrication circuit. Moreover, being located in the main tank with an inlet at least partially below the level of the lubricating liquid, the reserve tank is filled with lubricating liquid as soon as the mechanical system and/or the main lubrication circuit is started up.

According to a second embodiment of the disclosure, the lubrication system may comprise a supply pipe for supplying the reserve tank with lubricating liquid from the main lubrication circuit, the supply pipe connecting the inlet of the reserve tank to the main lubrication circuit, downstream of the main flow generator. As a result, the reserve tank is filled continuously with a portion of lubricating liquid circulating in the main lubrication circuit as soon as this main lubrication circuit is started up.

Furthermore, according to this second embodiment of the disclosure and in order to limit the flow rate of lubricating liquid supplying the reserve tank and guarantee a sufficient flow rate of lubricating liquid supplying the spraying devices of the main lubrication circuit, the supply pipe supplying the reserve tank can be configured so that the lubricating liquid circulates in the supply pipe at a supply flow rate less than a main flow rate of the lubricating liquid circulating in the main circuit. The lubricating liquid circulating in the main circuit is drawn in from the main tank by the main flow generator, and a flow rate of lubricating liquid supplies the spraying devices of the main lubrication circuit in order to effectively lubricate the mechanical system. For example, the supply flow rate is of the order of 1% to 5% of the main flow rate.

For this purpose, the lubrication system may include a supply flow rate reducer arranged between the main circuit and the inlet of the reserve tank. A supply flow rate reducer may also be arranged at the inlet of the reserve tank or else in the supply pipe. For example, a supply flow rate reducer has a diameter restriction or a calibrated port.

A supply flow rate reducer may also be provided at one end of the supply pipe, in particular the end of the supply pipe that allows the lubricating liquid to be discharged into the reserve tank. In this case, the supply flow rate reducer may be a spraying device designed to limit the flow rate of the sprayed lubricating liquid. Such a spraying device may be a calibrated port, a sprinkler, a nozzle or any equivalent means.

Irrespective of these two embodiments, the lubrication system according to the disclosure may comprise one or more of the following features, taken alone or in combination.

According to one example, the outlet pipe may be configured such that the lubricating liquid flows through the outlet pipe at an outlet flow rate that is less than the main flow rate of the lubricating liquid circulating in the main circuit. In the event of a failure in the lubrication system and a drop in the volume in the main tank below the main suction point, the main lubrication circuit is no longer supplied with the lubricating liquid drawn in from the main tank, but only with the lubricating liquid flowing from the reserve tank via the outlet pipe. For example, the outlet flow rate is of the order of 0.1% to 1% of the main flow rate.

The main flow generator makes it possible to draw in the lubricating liquid flowing from the outlet pipe of the reserve tank into the main suction pipe, even when this outlet flow rate is low, or even very low. Indeed, the main flow generator is designed to draw in this low flow rate flowing in the supply pipe. The main flow generator can then simultaneously draw in this lubricating liquid and air present in the supply pipe and coming from the main suction point, which is then located outside the lubricating liquid. For example, the main flow generator comprises a positive displacement pump.

The lubricating liquid then circulates through the main circuit and is conveyed to the spraying devices, a mist of lubricating liquid then being sprayed towards all the elements of the mechanical system to be lubricated. Although the flow rate of the sprayed lubricating liquid is low and well below the main flow rate, this mist of lubricating liquid makes it possible to provide sufficient residual lubrication to allow a few minutes of additional operation of the mechanical system.

In the context of the second embodiment, the majority of the lubricating liquid then circulating in the main circuit is conveyed to the spraying devices, while a small portion may be conveyed to the reserve tank via the supply pipe.

Since the volume of the reserve tank is limited, the outlet flow rate can be predetermined in order to ensure residual lubrication of the mechanical system for a predetermined time period depending on this outlet flow rate and on this volume. For example, the predetermined time period is of the order of 15 to 20 minutes such that, when the mechanical system equips an aircraft, the mechanical system is able to operate until this aircraft lands.

Furthermore, in order for the lubricating liquid to flow through the outlet pipe at the desired outlet flow rate, the lubrication system may, for example, include an outlet flow rate reducer arranged between the reserve tank and the main suction pipe. An outlet flow rate reducer may in particular be arranged in the outlet pipe or at the outlet of the reserve tank. For example, an outlet flow rate reducer includes a diameter restriction or a calibrated port.

Moreover, and for the second embodiment of the disclosure, the outlet flow rate is also less than the supply flow rate of the lubricating liquid circulating in the supply pipe. As a result, in the absence of a failure in the lubrication system, the reserve tank fills faster than it drains. The lubrication system according to the disclosure thus advantageously ensures that the reserve tank is permanently full, except in the event of a leak, and in particular when a failure occurs.

According to one example, the lubrication system may include a device for filtering the lubricating liquid entering the reserve tank. This filtration device may be a filter, for example a paper filter or a cloth filter, and makes it possible to capture foreign bodies and/or particles present in the lubricating liquid and therefore to limit or even prevent their presence in the reserve tank.

According to one example, the reserve tank may be open or closed. In particular, the reserve tank may be closed to prevent particles from the mechanical system from falling into the reserve tank.

In particular, when the reserve tank is closed, the reserve tank may comprise a port open towards the outside of the reserve tank. This open port, referred to as an "overflow", allows the lubricating liquid arriving from the supply pipe and not able to be contained in the reserve tank to be discharged. This open port also provides an air intake allowing the lubricating liquid to flow through the outlet pipe by gravity.

According to one example, the reserve tank may have at least one spill-proof wall. Indeed, when the mechanical system equips an aircraft, and this aircraft flies at a large angle of inclination, said at least one spill-proof wall prevents lubricating liquid from exiting the reserve tank when the reserve tank is open or comprises an open port.

A filter may be arranged at the inlet of the reserve tank.

In the context of the second embodiment, a filter may be arranged between the inlet of the reserve tank and the main lubrication circuit, for example on the supply pipe.

According to one example, the lubrication system according to the disclosure may include at least one secondary lubrication circuit. This secondary lubrication circuit can operate continuously and in parallel with the main lubrication circuit in order to lubricate the mechanical system. This secondary lubrication circuit can also operate following a failure of the main lubrication circuit and thus constitute a back-up lubrication circuit. The present disclosure advantageously makes it possible to overcome a failure in this secondary lubrication circuit.

Furthermore, the lubrication system may include a level indicator arranged in the reserve tank and configured to emit an image signal of an item of information relating to an amount of lubricating liquid present in the reserve tank. Such a level indicator may comprise two threshold levels, a first threshold corresponding to a high volume of lubricating liquid in the reserve tank to indicate that the reserve tank is full and is beginning to drain towards the main lubrication circuit, and a second threshold corresponding to a low volume of lubricating liquid in the reserve tank to indicate that the reserve tank is empty and consequently the total loss of lubrication of the mechanical system.

The present disclosure also relates to a mechanical system comprising rotating elements, such as shafts and bearings, and power transmission and speed reducing or increasing elements, such as pinions and/or gears.

This mechanical system is remarkable in that it is provided with a lubrication system as described above, the main tank of the lubrication system being constituted by a casing of the mechanical system.

The mechanical system may be a main gearbox intended for a rotary-wing aircraft.

Finally, the present disclosure relates to a rotary-wing aircraft comprising at least one main rotor and at least one main gearbox rotating this at least one main rotor. The main gearbox may be provided with a lubrication system as described above, the main tank of the lubrication system being constituted by a casing of the main gearbox.

BRIEF DESCRIPTION OF THE DRAWINGS

The disclosure and its advantages appear in greater detail from the following description of examples given by way of illustration with reference to the accompanying figures, in which.

DETAILED DESCRIPTION

Elements present in more than one of the figures are given the same references in each of them.

Figure 1:
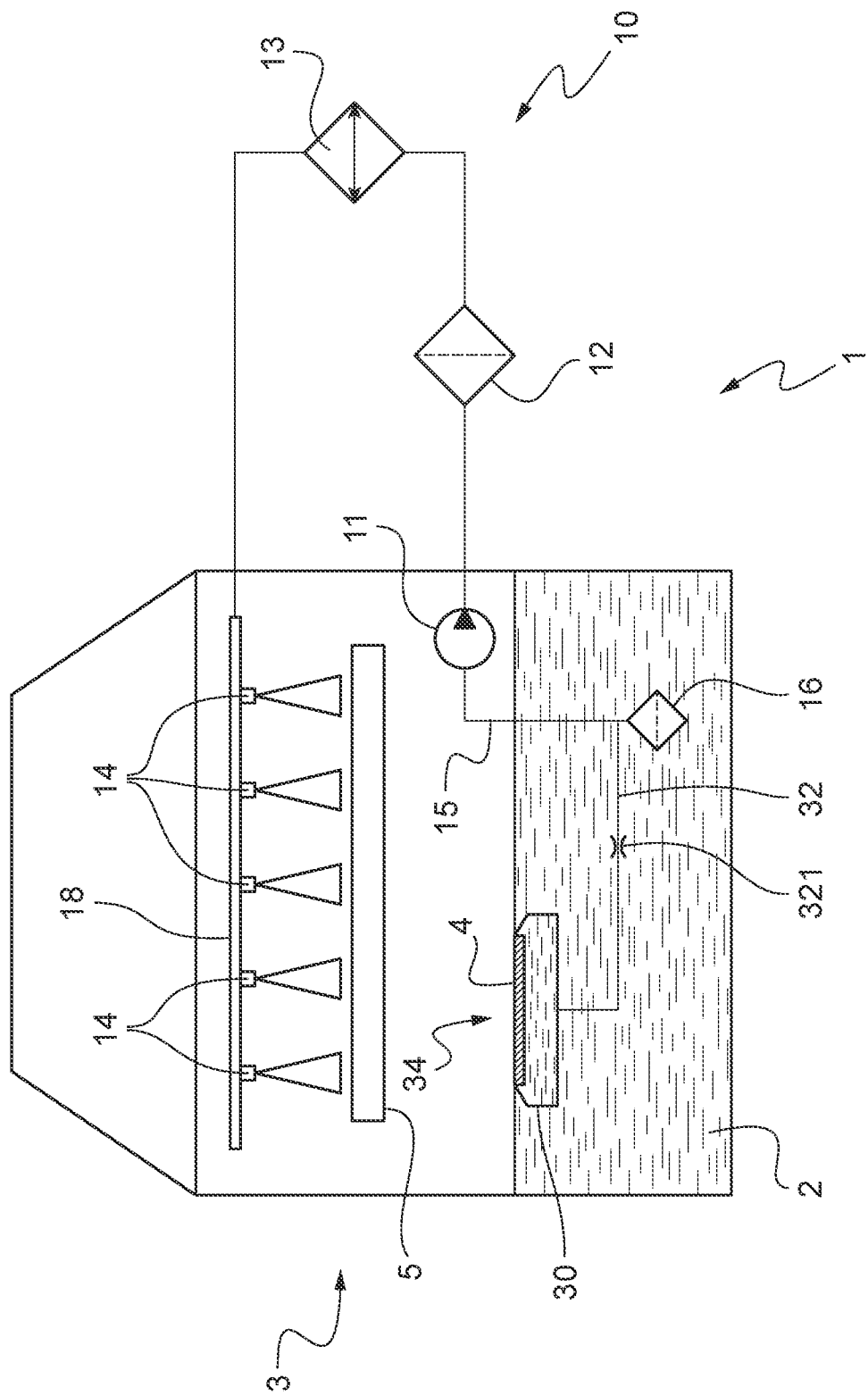
FIG. 1 is an example of a first embodiment of a lubrication system according to the disclosure.
Figure 2:
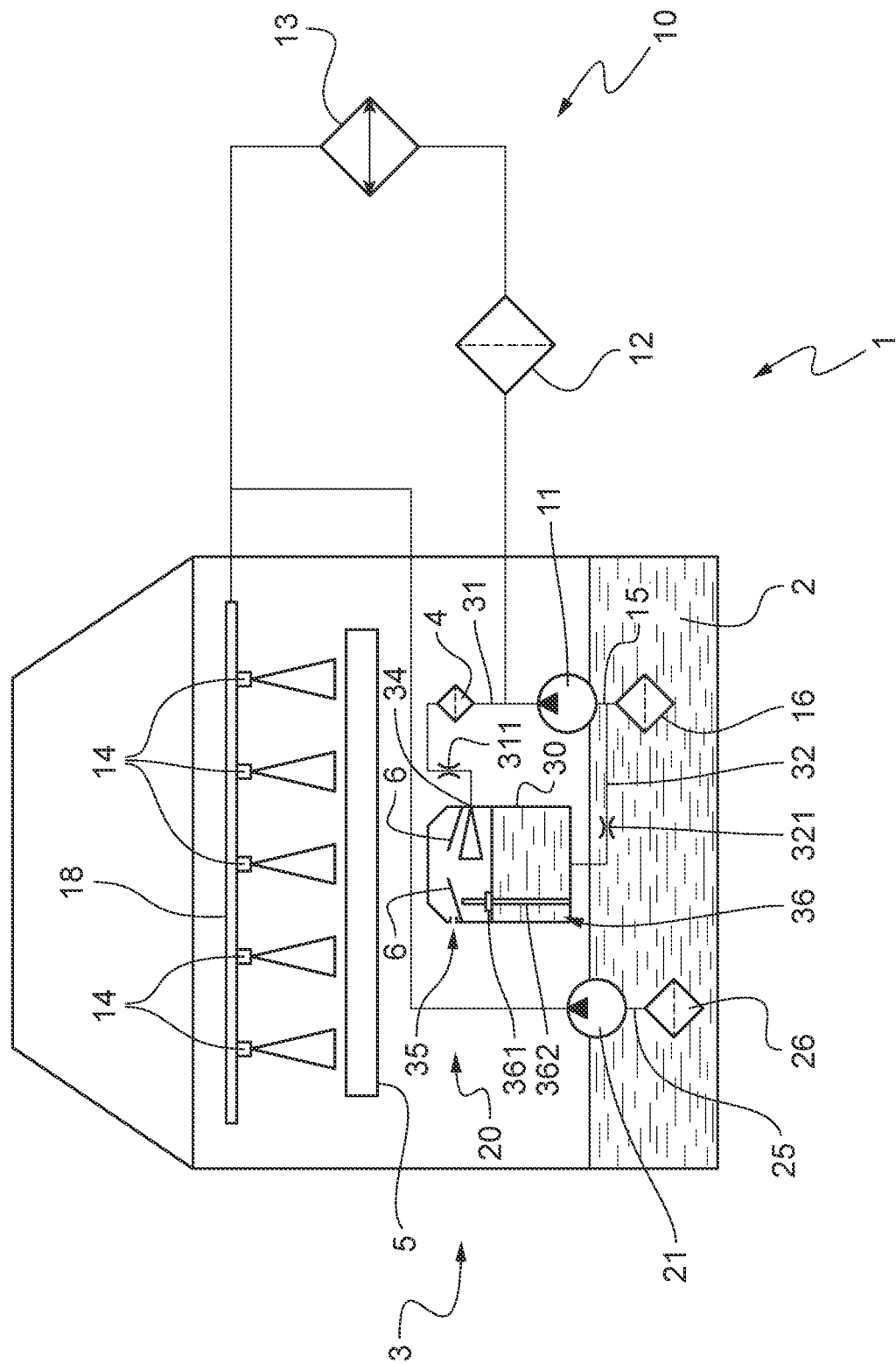
FIG. 2 is an example of a second embodiment of a lubrication system according to the disclosure.

Two embodiments of a lubrication system 1, shown in FIGS. 1 and 2, have the function of lubricating a mechanical system 3 comprising, in particular, rotating elements 5, such as shafts and bearings, and power transmission and speed reducing or increasing elements 5, such as pinions and/or gears. For example, this mechanical system 3 is a main gearbox possibly equipping a rotary-wing aircraft or the like. The main tank 2 is formed, for example, by a casing of the mechanical system 3.

FIG. 1 shows a first embodiment of the lubrication system 1.

FIG. 2 shows a second embodiment of the lubrication system 1.

The lubrication system 1 of both embodiments comprises a main tank 2, a reserve tank 30, a main lubrication circuit 10, and an outlet pipe 32 for the reserve tank 30. The main tank 2 contains a lubricating liquid intended for lubricating the mechanical system 3.

The main lubrication circuit 10 comprises, for each embodiment, a main flow generator 11, one or more pipes, devices 14 for spraying the lubricating liquid, a main suction point 16 for drawing in the lubricating liquid located in the main tank 2 and a main suction pipe 15 connecting the main suction point 16 to the main flow generator 11. The spraying devices 14 are arranged on a rail 18 through which lubricating liquid circulates and are positioned to direct the lubricating liquid towards elements 5 of the mechanical system 3 to be lubricated. The main lubrication circuit 10 may also comprise a main filter 12, for example a paper filter, intended to filter the lubricating liquid circulating in the main circuit 10 and/or a heat exchanger 13 intended to cool the lubricating liquid circulating in the main circuit 10.

The main flow generator 11 thus draws in the lubricating liquid from the main tank 2 via the main suction point 16 and directs it towards the spraying devices 14, via one or more pipes and, if applicable, via the heat exchanger 13 and/or the main filter 12, in order to lubricate the elements 5 of the mechanical system 3.

In addition, the reserve tank 30 includes an inlet 34 through which the reserve tank 30 is supplied with lubricating liquid coming directly or indirectly from the main tank 2. Moreover, the reserve tank 30 is situated higher than the main suction point 16, in the direction of the Earth's gravity. More precisely, the reserve tank 30 is situated at least partially at a first plane and the main suction point 16 is situated at a second plane, the first plane and the second plane being perpendicular to the direction of the Earth's gravity, the first plane being above the second plane, in the direction of the Earth's gravity. The outlet pipe 32 connects the reserve tank 30 to the main suction pipe 15. Thus, the lubricating liquid contained in the reserve tank 30 can flow by gravity through the outlet pipe 32 until it reaches the main suction pipe 15. The lubricating liquid is then drawn in by the main flow generator 11 and introduced into the main circuit 10.

When the level of the lubricating liquid in the main tank 2 drops below the main suction point 16, the main lubrication circuit 10 is supplied solely by the reserve tank 30, via the outlet pipe 32. The reserve tank 30 thus makes it possible to supply the main circuit 10 with lubricating liquid for a limited, but possibly predetermined, time period, in order to ensure residual lubrication of the elements 5 of the mechanical system 3 via the spraying devices 14.

Advantageously, the outlet pipe 32 may be configured so that the lubricating liquid flows through the outlet pipe 32 at an outlet flow rate that is less than a main flow rate of the lubricating liquid circulating in the main circuit 10. As a result, residual lubrication is provided at a flow rate of lubricating liquid that is less than the flow rate of the nominal lubrication that is provided in the absence of a failure, such that this residual lubrication is provided for a limited time period that is sufficient, in particular, to allow the aircraft to land when the mechanical system 3 equips an aircraft.

For example, the main flow rate of the lubricating liquid circulating in the main circuit 10 may be of the order of 4,000 liters per hour, whereas the outlet flow rate of the lubricating liquid in the outlet pipe 32 may be of the order of 4 liters per hour. The volume of the reserve tank 30 may be of the order of 1 to 3 liters, whereas the volume of the main tank may be of the order of 20 to 40 liters. Consequently, residual lubrication can be provided for a duration of 15 minutes to 1 hour, approximately.

In order to ensure this limitation of the outlet flow rate, the lubrication system 1 may include an outlet flow rate reducer 321 arranged between the reserve tank 30 and the main suction pipe 15, in particular in the outlet pipe 32 or at the outlet of the reserve tank 30. For example, an outlet flow rate reducer 321 may include a diameter restriction or a calibrated port. The outlet flow rate reducer 321 may also comprise the outlet pipe 32 in its entirety, the inner diameter of this outlet pipe 32 being limited in order to ensure that the desired outlet flow rate is achieved.

The lubrication system 1 shown in FIG. 2 also comprises a secondary lubrication circuit 20 provided with a secondary flow generator 21, secondary pipes, a secondary suction point 26 for drawing in the lubricating liquid located in the main tank 2 and a secondary suction pipe 25 connecting the secondary suction point 26 to the secondary flow generator 21. The secondary circuit 20 is connected to the rail 18 and to the spraying devices 14 and can thus supply the spraying devices 14 with lubricating liquid in order to lubricate the elements 5 of the mechanical system 3.

The secondary suction point 26 is situated lower than the main suction point 16 in the main tank 2. As a result, following a leak in the main circuit 10, the level of lubricating liquid will drop to the main suction point 16. The main circuit 10 can then no longer draw in lubricating liquid from the main tank 2. The secondary circuit 20 will then operate alone in order to supply the spraying devices 14 to lubricate the mechanical system 3, despite this leakage in the main circuit 10.

Furthermore, the main and secondary suction points 16, 26 may comprise a filter such as a strainer.

According to the first embodiment shown in FIG. 1, the reserve tank 30 is located in the main tank 2 and the inlet 34 is open to the outside of the reserve tank 30, on the upper face of the reserve tank 30. The reserve tank 30 is positioned in such a way that the inlet 34 is situated at least partially below the nominal level of the lubricating liquid in the main tank 2. According to FIG. 1, the inlet 34 occupies the entire upper part of the reserve tank 30. However, an inlet 34 may be positioned differently provided that it is at least partially below the nominal level of the lubricating liquid in the main tank 2. Thus, the lubricating liquid located in the main tank 2 can enter the reserve tank 30 via the inlet 34. Furthermore, the lubricating liquid sprayed by the spraying devices 14 can also flow by gravity from the elements 5 of the mechanical system 3, possibly directly into the reserve tank 30.

Moreover, a filter 4 can be positioned at the inlet 34 in order to filter the lubricating liquid entering the reserve tank 30. Therefore, as shown in FIG. 1, the inlet 34 of the reserve tank 30 may be covered by a filter 4 comprising, for example, a fine-mesh strainer for preventing particles from entering the reserve tank 30.

In the second embodiment shown in FIG. 2, the lubrication system 1 includes a supply pipe 31 connecting the inlet 34 of the reserve tank 30 to the main lubrication circuit 10 downstream of the main flow generator 11. The supply pipe 31 thus makes it possible to supply the reserve tank 30 with the lubricating liquid circulating in the main lubrication circuit 10.

The reserve tank 30 may be located in the mechanical system 3, above the main tank 2 as shown in FIG. 2. However, the reserve tank 30 may also be immersed at least partially in the main tank 2 or positioned outside the mechanical system 3, as long as the reserve tank 30 is located higher than the main suction point 16 in the direction of the Earth's gravity.

Furthermore, the supply pipe 31 of the reserve tank 30 can be configured so that the lubricating liquid circulates in the supply pipe 31 at a supply flow rate that is less than a main flow rate of the lubricating liquid circulating in the main circuit 10. As a result, the majority of the lubricating liquid circulating in the main circuit 10 is effectively directed to the spraying devices in order to lubricate the elements 5 of the mechanical system 3. A small quantity of the lubricating liquid circulating in the main circuit 10 is thus directed towards the reserve tank 30 via the supply pipe 31.

Furthermore, the supply flow rate may be higher than the outlet flow rate of the lubricating liquid circulating in the outlet pipe 32 in order for the reserve tank 30 to fill through the supply pipe 31 more quickly than it is drained through the outlet pipe 32. As a result, in the absence of any failure of the lubrication system 10, the reserve tank 30 fills gradually when the main lubrication circuit 10 is started, and then remains permanently full. For example, the main flow rate may be of the order of 4,000 liters per hour, the outlet flow rate may be of the order of 4 liters per hour and the supply flow rate may be of the order of 40 liters per hour.

In order to ensure this limitation of the supply flow rate, the lubrication system 1 may include a supply flow rate reducer 311 arranged between the main circuit 10 and the inlet 34 of the reserve tank 30, in the supply pipe 31 or indeed at the inlet 34 of the reserve tank 30. For example, a supply flow rate reducer 311 may include a diameter restriction or a calibrated port. The supply flow rate reducer 311 may also comprise the supply pipe 31 in its entirety, the inner diameter of this supply pipe 31 being limited in order to ensure that the desired supply flow rate is obtained.

A supply flow rate reducer 311 may include a spraying device arranged at the inlet 34, the spraying device being designed to limit the flow rate of the sprayed lubricating liquid.

The lubrication system 1 may also comprise a filter 4, such as a paper filter, for example, arranged between the inlet 34 of the reserve tank 30 and the main lubrication circuit 10, in particular on the supply pipe 31.

In the example shown of this second embodiment, the reserve tank 30 may also be closed and comprise a port 35 open towards the outside of the tank 30. In particular, the open port 35 allows the reserve tank 30 to be vented to the pressure outside it, such that the lubricating liquid can flow through the outlet pipe 32 by gravity. The port 35 also acts as an overflow, balancing the flows entering and exiting the reserve tank 30.

However, the reserve tank 30 may also be open, for example in its upper part.

Irrespective of the embodiment of the disclosure, the reserve tank 30 may comprise at least one spill-proof wall 6, and, for example, two spill-proof walls 6 as shown in FIG. 2. The spill-proof walls 6 prevent lubricating liquid from exiting the reserve tank 30 through the open port 35 when the mechanical system 3 is tilted, in particular when it is fitted to an aircraft or a boat.

Irrespective of the embodiment of the disclosure, the lubrication system 1 may also comprise a level indicator 36 arranged in the reserve tank 30 as shown in FIG. 2. The level indicator 36 comprises, for example, a float 361 capable of sliding on a shaft 362 arranged vertically and in a fixed manner in the reserve tank 30. As a result, the position of the float 361 along the length of the shaft 362 corresponds to the quantity of lubricating liquid present in the reserve tank 30.

The level indicator 36 also comprises a sensor delivering an image signal of an item of information indicating this position of the float 361 along the length of the shaft 362, thus corresponding to an item of information relating to the amount of lubricating liquid present in the reserve tank 30.

Naturally, the present disclosure is subject to numerous variations as regards its implementation. Although several implementations are described above, it should readily be understood that an exhaustive identification of all possible embodiments is not conceivable. It is naturally possible to replace any of the means described with equivalent means without going beyond the ambit of the present disclosure.

For example, the lubrication system 1 according to the first embodiment may also include at least one spill-proof wall 6 and/or one level indicator 36.

What is claimed is:

1. A lubrication system for a mechanical system, the lubrication system comprising:
    a main tank containing a lubricating liquid;
    a main lubrication circuit comprising a main flow generator as well as devices for spraying the lubricating liquid, the main lubrication circuit comprising a main suction point for drawing in the lubricating liquid located in the main tank, a main suction pipe connecting the main suction point to the main flow generator;
    a reserve tank comprising an inlet for receiving a portion of the lubricating liquid from the main tank, wherein the reserve tank is arranged in an environment where an outside pressure is prevailing outside the reserve tank;
    an outlet pipe directly connecting the reserve tank to the main suction pipe, wherein the lubricating liquid communicates through the outlet pipe between the reserve tank and the main suction pipe by gravity;
    a vent port disposed on the reserve tank, wherein opening the vent port vents the reserve tank to the outside pressure outside of the reserve tank and so that the lubricating liquid can flow through the outlet pipe by gravity, the open vent port acting as an overflow, balancing flows of lubricating liquid entering and exiting the reserve tank; and
    at least one spill-proof wall positioned within the reserve tank adjacent to the vent port and the spill-proof wall extends from a side wall upward between the inlet and the vent port to prevent the lubricating liquid from exiting the vent port when the system is tilted.

2. The lubrication system according to claim 1, wherein the outlet pipe is configured so that the lubricating liquid flows through the outlet pipe at an outlet flow rate that is less than a main flow rate of the lubricating liquid flowing in the main lubrication circuit.

3. The lubrication system according to claim 1, wherein the lubrication system includes an outlet flow rate reducer arranged between the reserve tank and the main suction pipe.

4. The lubrication system according to claim 1, wherein the lubrication system comprises a supply pipe for supplying the reserve tank with lubricating liquid from the main lubrication circuit, the supply pipe connecting the inlet of the reserve tank to the main lubrication circuit downstream of the main flow generator.

5. The lubrication system according to claim 4, wherein the lubrication system comprises a filter arranged between the inlet of the reserve tank and the main lubrication circuit.

6. The lubrication system according to claim 4, wherein the supply pipe of the reserve tank is configured so that the lubricating liquid circulates in the supply pipe at a supply flow rate that is less than a main flow rate of the lubricating liquid circulating in the main lubrication circuit.

7. The lubrication system according to claim 6, wherein the lubrication system includes a supply flow rate reducer arranged between the main lubrication circuit and the inlet of the reserve tank or at the inlet or indeed at one end of the supply pipe.

8. The lubrication system according to claim 1, wherein the reserve tank is located in the main tank and is arranged at least partially below the level of the lubricating liquid in the main tank.

9. The lubrication system according to claim 1, wherein the lubrication system comprises a filter.

10. The lubrication system according to claim 1, wherein the vent port is positioned along the side wall.

11. The lubrication system according to claim 1, wherein the lubrication system comprises at least one secondary lubrication circuit.

12. The lubrication system according to claim 1, wherein the lubrication system includes a level indicator arranged in the reserve tank and configured to emit an image signal of an item of information relating to an amount of lubricating liquid present in the reserve tank.

13. A mechanical system,
wherein the mechanical system is provided with the lubrication system according to claim 1, the main tank of the lubrication system being constituted by a casing of the mechanical system.

14. The mechanical system according to claim 13,
wherein the mechanical system is a main gearbox of a rotary-wing aircraft.

15. A rotary-wing aircraft provided with at least one main gearbox
wherein the main gearbox is provided with the lubrication system according to claim 1, the main tank of the lubrication system being constituted by a casing of the main gearbox.

16. A lubrication system for a mechanical system, the lubrication system comprising:
- a main tank containing a lubricating liquid;
- a reserve tank having an inlet for receiving a portion of the lubricating liquid from the main tank;
- a main lubrication circuit having a main suction pipe in fluid communication with the main tank, the main lubrication circuit circulating the lubricating liquid to devices for applying the lubricating liquid;
- an outlet pipe directly connecting the reserve tank to the main suction pipe, wherein the lubricating liquid communicates through the outlet pipe between the reserve tank and the main suction pipe by gravity;
- a vent port disposed on the reserve tank, wherein opening the vent port vents the reserve tank to an outside pressure outside of the reserve tank so the lubricating liquid can flow through the outlet pipe by gravity, the vent port being open and acting as an overflow, balancing flows of lubricating liquid entering and exiting the reserve tank; and
- at least one spill-proof wall extending from a side wall upward between the inlet and the vent port within the reserve tank to prevent the lubricating liquid from exiting the reserve tank through the vent port when the system is tilted.

17. The lubrication system according to claim 16, wherein the outlet pipe is configured so that the lubricating liquid flows through the outlet pipe at an outlet flow rate that is less than a main flow rate of the lubricating liquid flowing in the main lubrication circuit.

18. The lubrication system according to claim 16, wherein the lubrication system includes an outlet flow rate reducer arranged between the reserve tank and the main suction pipe.

19. The lubrication system according to claim 16, wherein a supply pipe of the reserve tank is configured so that the lubricating liquid circulates in the supply pipe at a supply flow rate that is less than a main flow rate of the lubricating liquid circulating in the main lubrication circuit.

20. The lubrication system according to claim 16, wherein the at least one spill-proof wall extends adjacent the vent port.

* * * * *